US 12,358,461 B1

(12) United States Patent
Farooq et al.

(10) Patent No.: US 12,358,461 B1
(45) Date of Patent: Jul. 15, 2025

(54) CABLE-GUIDED AIRBAG INFLATABLE ACROSS DOOR OPENING

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/928,301

(22) Filed: Oct. 28, 2024

(51) Int. Cl.
| *B60R 21/2338* | (2011.01) |
| *B60J 5/04* | (2006.01) |
| *B60R 21/21* | (2011.01) |
| *B60R 21/231* | (2011.01) |
| *B62D 25/02* | (2006.01) |

(52) U.S. Cl.
CPC ........ *B60R 21/2338* (2013.01); *B60J 5/0479* (2013.01); *B60R 21/21* (2013.01); *B60R 21/23138* (2013.01); *B62D 25/025* (2013.01); *B60J 2005/0475* (2013.01); *B60R 2021/23386* (2013.01)

(58) Field of Classification Search
CPC ............... B60R 21/2338; B60R 21/21; B60R 21/23138; B60R 2021/23386; B60J 5/0479; B60J 2005/0475; B62D 25/025
See application file for complete search history.

(56) References Cited

U.S. PATENT DOCUMENTS

| 7,472,922 B2* | 1/2009 | Wu ..................... B60R 21/2338 |
| | | 280/730.2 |
| 10,632,951 B2* | 4/2020 | Nusier ................... B62D 25/20 |
| 10,682,972 B2* | 6/2020 | Faruque ................. B60R 21/08 |

(Continued)

FOREIGN PATENT DOCUMENTS

| JP | 2005096652 A | * 4/2005 | .......... B60R 21/232 |
| JP | 2007091057 A | 4/2007 | |

(Continued)

OTHER PUBLICATIONS

JP-2005096652-A (machine translation) (Year: 2005).*

(Continued)

*Primary Examiner* — Jason D Shanske
*Assistant Examiner* — Joselynn Y Sliteris
(74) *Attorney, Agent, or Firm* — Frank A. MacKenzie; Brooks Kushman P.C.

(57) ABSTRACT

A vehicle body includes a door opening frame including a sill and a front portion and a rear portion each extending upwardly from the sill. The door opening frame has a top portion extending along a vehicle-longitudinal axis from the front portion to the rear portion. An airbag is mounted to the sill. A front cable and a rear cable are each connected to the airbag. At least one cable retractor is mounted to the vehicle body above the top portion of the door opening frame. The front cable in the undeployed position is packaged along the front portion and the top portion of the door opening frame from the airbag to the at least one cable retractor. The rear cable in the undeployed position is packaged along the rear portion and the top portion of the door opening frame from the airbag to the at least one cable retractor.

20 Claims, 5 Drawing Sheets

(56) References Cited

U.S. PATENT DOCUMENTS

| | | | |
|---|---|---|---|
| 11,148,631 B2 * | 10/2021 | Jaradi | B60R 21/205 |
| 11,760,300 B1 | 9/2023 | Jaradi et al. | |
| 11,958,430 B1 * | 4/2024 | Faruque | B60R 21/213 |
| 11,975,675 B2 | 5/2024 | Faruque et al. | |
| 11,987,200 B2 | 5/2024 | Nagasawa | |
| 12,017,715 B2 * | 6/2024 | Jaradi | B60R 21/2338 |
| 12,071,094 B2 * | 8/2024 | Farooq | B60R 21/213 |
| 12,128,845 B2 * | 10/2024 | Jaradi | B60R 21/23138 |
| 2006/0055153 A1 * | 3/2006 | Hirata | B60N 2/42709 |
| | | | 280/728.1 |
| 2024/0092304 A1 | 3/2024 | Jaradi et al. | |

FOREIGN PATENT DOCUMENTS

| | | | | |
|---|---|---|---|---|
| KR | 100526149 B1 | 11/2005 | | |
| KR | 102461508 B1 | 11/2022 | | |
| WO | WO-0240322 A1 * | 5/2002 | | B60R 21/232 |
| WO | 2020165112 A1 | 8/2020 | | |

OTHER PUBLICATIONS

Neuwirth, "On the Safe Side", ZF, https://www.zf.com/mobile/en/stories_18304.html, downloaded Jul. 8, 2024.

* cited by examiner

CABLE-GUIDED AIRBAG INFLATABLE ACROSS DOOR OPENING

BACKGROUND

A vehicle may include amenities that allow occupants ingress and egress of the vehicle. For example, a vehicle may not include a vertical, body-mounted pillar between the front pillar and rear pillar of a door opening to allow more space for occupants to ingress and egress the vehicle. Specifically, such vehicles may include two doors that meet at the location traditionally occupied by the vertical, body-mounted pillar when in a closed position. The door may be rotatable about the front pillar and the rear pillar, respectively, such that the doors rotate away from each other to an open position.

DETAILED DESCRIPTION

Figure 2:
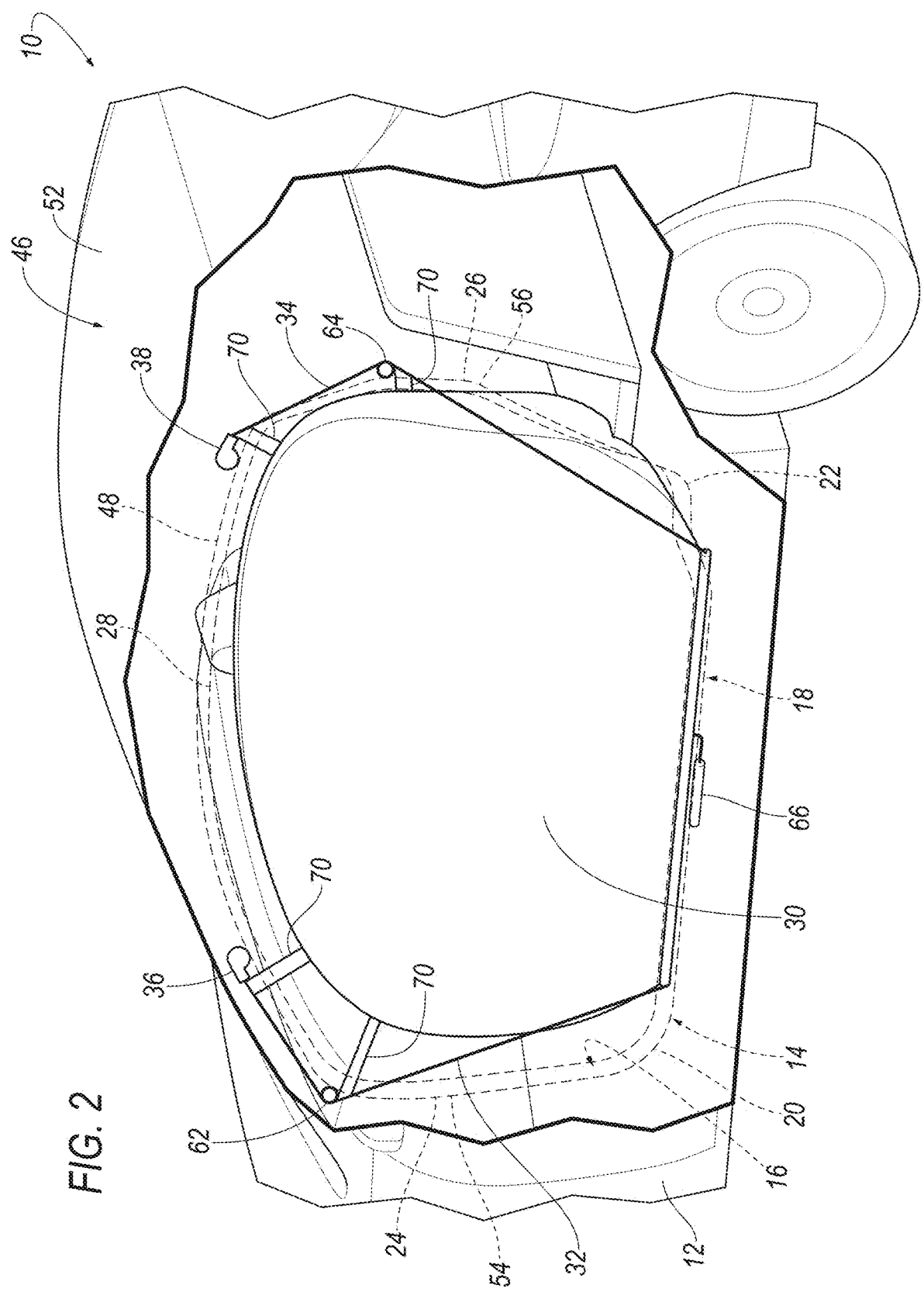
FIG. 2 is a cutaway view of the exterior of the vehicle showing the airbag in a raised position.
Figure 3:
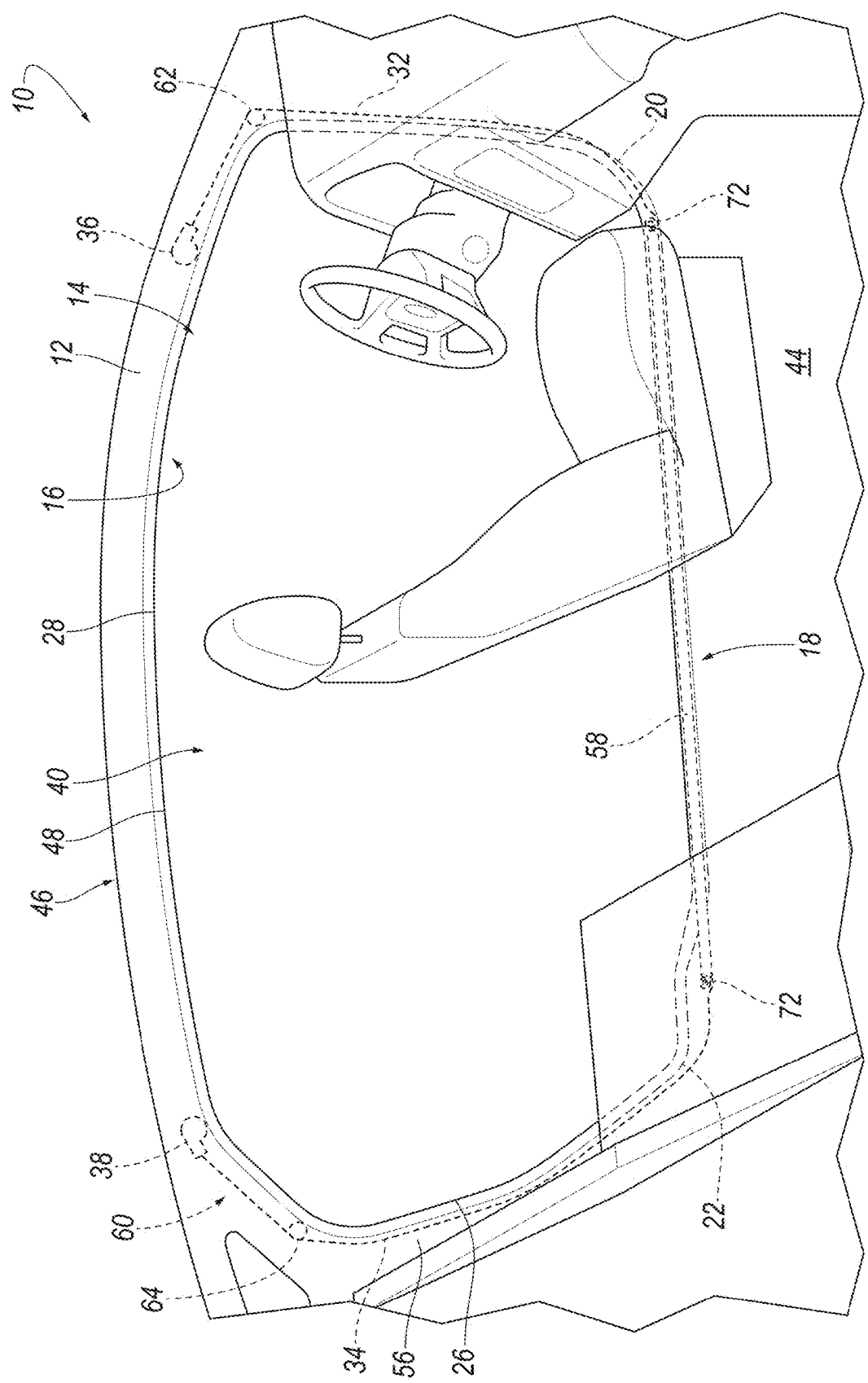
FIG. 3 is a cutaway view of an interior of a vehicle showing the airbag in the undeployed position.
Figure 4:
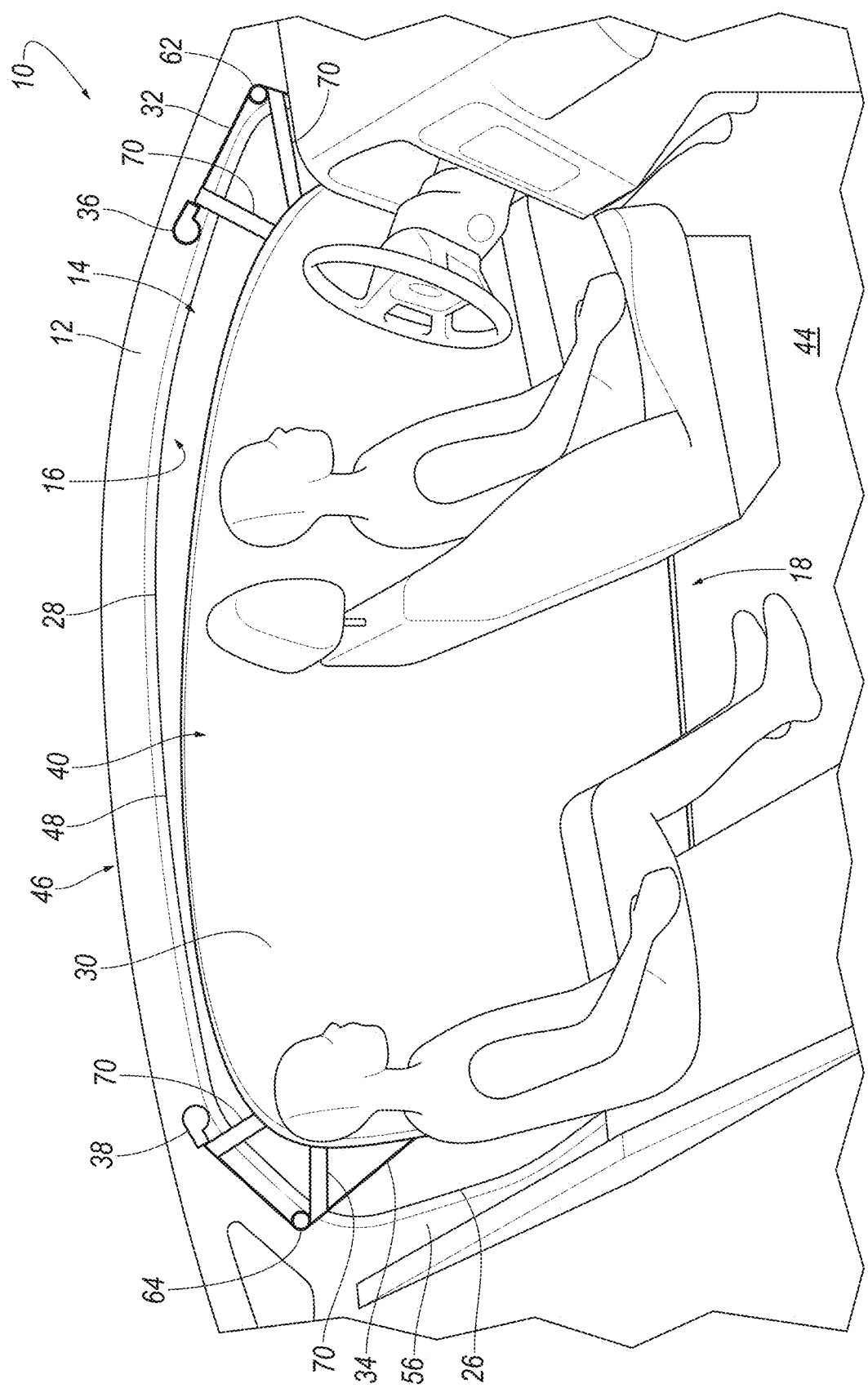
FIG. 4 is a cutaway view of the interior of the vehicle showing the airbag in the raised position.

With reference to the Figures, wherein like numerals indicate like parts throughout the several views, a vehicle 10 includes a vehicle body 12 including a door opening 14 and a door opening frame 16 encircling the door opening 14. The door opening frame 16 includes a sill 18 elongated along a vehicle-longitudinal axis L from a front end 20 of the sill 18 to a rear end 22 of the sill 18. The door opening frame 16 has a front portion 24 extending upwardly from the front end 20 of the sill 18 and a rear portion 26 extending upwardly from a rear end 22 of the sill 18. The door opening frame 16 has a top portion 28 extending along the vehicle-longitudinal axis from the front portion 24 to the rear portion 26. An airbag 30 is mounted to the sill 18 and is deployable upwardly toward the top portion 28 of the door opening frame 16 from an undeployed position (FIGS. 1 and 3) to a raised position (FIGS. 2 and 4). A front cable 32 and a rear cable 34 are each connected to the airbag 30. At least one cable retractor 36, 38 is mounted to the vehicle body 12 above the top portion 28 of the door opening frame 16. The front cable 32 and the rear cable 34 are operatively engaged with the at least one cable retractor to pull the airbag 30 upwardly from the undeployed position to the raised position. The front cable 32 in the undeployed position is packaged along the front portion 24 and the top portion 28 of the door opening frame 16 from the airbag 30 to the at least one cable retractor. The rear cable 34 in the undeployed position is packaged along the rear portion 26 and the top portion 28 of the door opening frame 16 from the airbag 30 to the at least one cable retractor 36, 38.

Since the front cable 32 is packaged along the front portion 24 and the top portion 28, the rear cable 34 is packaged along the rear portion 26 and the top portion 28, and the airbag 30 is mounted to the sill 18, the front cable 32, the rear cable 34, and the airbag 30 are positioned to allow for occupant ingress and egress through the door opening 14. In the raised position, the at least one tether 70 retractor, e.g. the first tether 70 retractor 36 and the second tether 70 retractor 38 in the example shown in the Figures, retracts the front cable 32 and the rear cable 34 to pull the airbag 30 upwardly to the raised position. The airbag 30 in the raised position extends across the door opening 14 and the airbag 30 is supported by the front cable 32 and the rear cable 34. Specifically, the airbag 30 is moveable with the front cable 32 and the rear cable 34, and the front cable 32 and the second cable 34 move the airbag 30 across the door opening 14 when the at least one cable retractor 36, 38 retracts the front cable 32 and the second cable 34. Since the airbag 30 is mounted to the sill 18, the airbag 30 in the undeployed position reduces packaging constraints in the area of the top portion 28 of the door opening frame 16. In such an example, the airbag 30 extends across the door opening 14 and the front cable 32 and the second cable 34 anchor the airbag 30 to the door opening frame 16. The airbag 30, the front cable 32, and the second cable 34 distribute forces to the sill 18, the front portion 24, the rear portion 26, and the top portion 28 in the raised position. The airbag 30 may be deployed to the raised position in response to certain vehicle impacts, e.g., side impacts. In some examples, including the example shown in the Figures, the vehicle 10 does not include a pillar between the front portion 24 and the rearward portion of the door opening frame 16. In such examples, the airbag 30 in the raised position, as anchored to the door opening frame 16, extends across the door opening 14, and in some examples, may extend across two doors in the door opening 14.

The vehicle 10 may be any suitable type of automobile, e.g., a passenger or commercial automobile such as a sedan, a coupe, a truck, a sport utility, a crossover, a van, a minivan, a taxi, a bus, etc. The vehicle 10 includes a vehicle body 12 including pillars, body panels (including a roof 46, a floor 44, etc.) etc. The vehicle 10 includes an occupant compartment 40 to house occupants of the vehicle 10. The occupant compartment 40 may extend across the vehicle 10, i.e., from one side to the other side of the vehicle 10. The occupant compartment 40 includes a front end 20 and a rear end 22 with the front end 20 being in front of the rear end 22 during forward movement of the vehicle 10.

Figure 1:
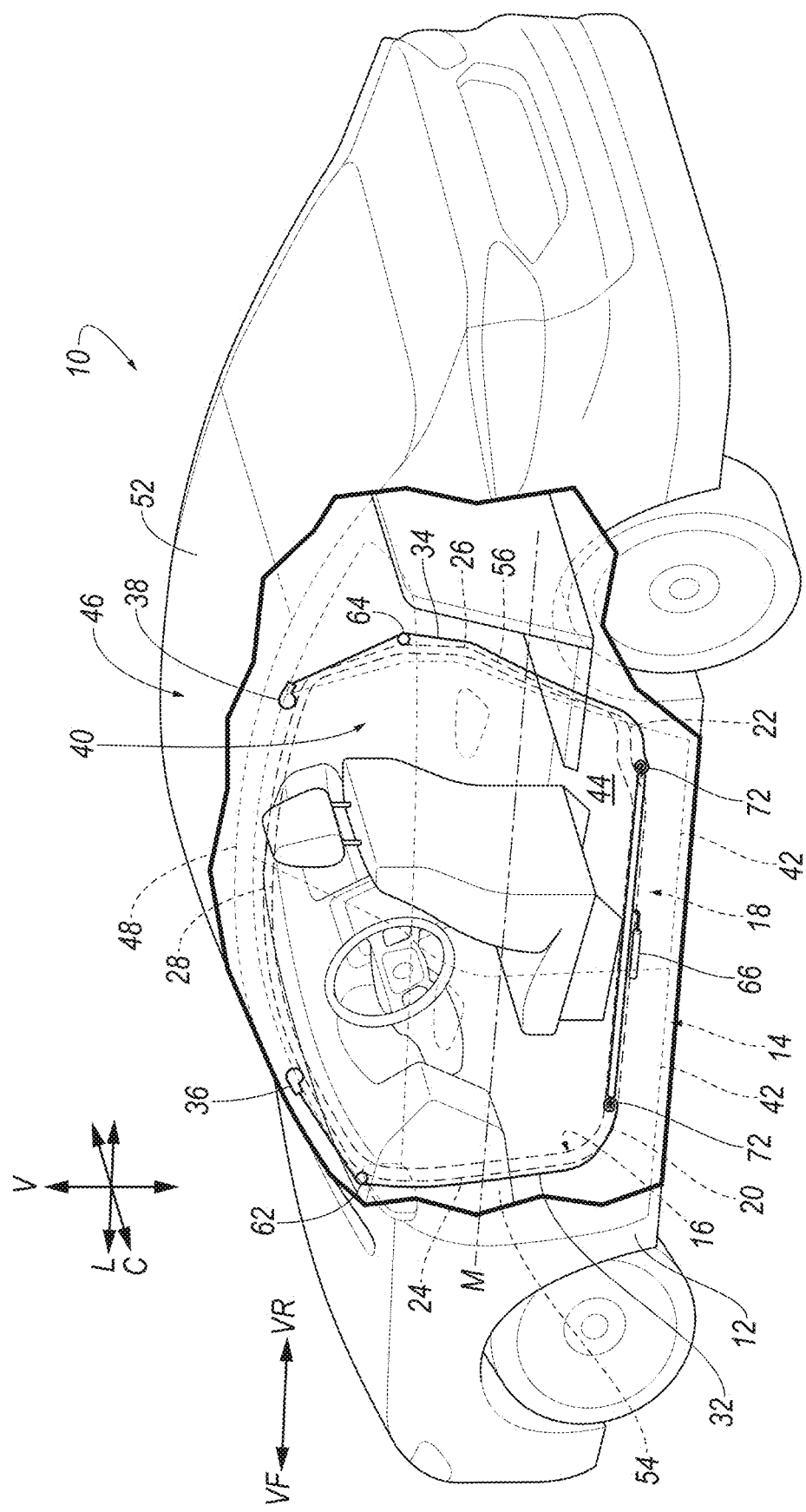
FIG. 1 is a cutaway view of an exterior of a vehicle showing an airbag in an undeployed position.

With reference to FIG. 1, the vehicle 10 defines a vehicle-longitudinal axis L extending between the front end 20 and the rear-end of the vehicle 10. The vehicle 10 defines a vehicle-lateral axis C extending cross-vehicle from one side to the other side of the vehicle 10. The vehicle 10 defines a vertical axis V extending through the floor 44 and ceiling of the vehicle 10. The vehicle-longitudinal axis L, the vehicle-lateral axis C, and the vertical axis V are perpendicular relative to each other.

Relative vehicular orientations and directions by way of example, forward, rearward, top, bottom, front, rear, left, right, etc., are from the perspective of an occupant seated in the vehicle 10 and facing forward, e.g., toward a forward instrument panel and/or forward windshield of the vehicle 10. "Vehicle forward" is a parallel to direction of movement of the vehicle 10 when the vehicle 10 is engaged in forward drive with wheels of the vehicle 10 straight. "Vehicle rearward" is a direction opposite "vehicle forward." In FIG. 1, vehicle forward is identified with identifier VF and vehicle rearward is identified with identifier VR. Orientations and directions relative to the assembly are given related to when the assembly is supported by the vehicle 10 as described below and shown in the Figures.

In the example shown in the Figures, the vehicle 10 includes two door openings 14, i.e., one door opening 14 on the left side of the vehicle 10 and one door opening 14 on the right side of the vehicle 10. In examples including more than one door opening 14, the vehicle 10 may include and airbag 30 and corresponding components at any one or all of the door openings 14.

The vehicle 10 includes the vehicle body 12 and a vehicle frame. The vehicle frame may be of a unibody construction in which the frame is a unit with a vehicle body 12 (including frame rails, pillars, roof rails 48, etc.). As another example, the body 12 and frame may have a body-on-frame construction (also referred to as a cab-on-frame construction) in which the body 12 and frame are separate components, i.e., are modular, and the body 12 is supported on and affixed to the frame. Alternatively, the frame and body 12 may have any suitable construction. The frame and body 12 may be of any suitable material, for example, steel, aluminum, and/or fiber-reinforced plastic, etc.

The vehicle body 12 includes the door opening 14 and the door opening frame 16 encircling the door opening 14. The door opening 14 is the space between the door opening frame 16 that receives one or more door 42. In the example shown in the Figures, for example, the door opening 14 is designed to receive two doors 42. The door opening frame 16 includes components of the vehicle body 12 that define the door opening 14. In other words, the sill 18, the front portion 24, the rear portion 26, and the top portion 28 of the door opening frame 16 are components of the vehicle body 12 around the door opening 14. As set forth above, the sill 18, the front portion 24, the rear portion 26, and the top portion 28 encircle the door opening 14, i.e., extend endlessly around the door opening 14 in any suitable shape.

The vehicle body 12 includes the floor 44 and the roof 46. At least a portion of the door opening frame 16 includes one or more components of the floor 44 and the roof 46. The roof 46 defines the upper boundary of the occupant compartment 40 and may extend from the front end 20 of the occupant compartment 40 to the rear end 22 of the occupant compartment 40. The floor 44 is below from the roof 46. The floor 44 defines the lower boundary of the occupant compartment 40 and may extend from the front end 20 of the occupant compartment 40 to the rear end 22 of the occupant compartment 40.

The roof 46 provides cover for occupants for the vehicle 10. The roof 46 may include roof rails 48, cross-beams, an exterior panel 52, and a headliner. The roof rails 48 may be elongated along the vehicle-longitudinal axis L and the roof beams may be elongated along the vehicle-lateral axis. The cross-beams support the exterior panel, the headliner, etc. The roof rails 48 and the cross-beams may be steel, aluminum, carbon fiber, or any other suitable material. The cross-beams may be elongated along the vehicle-lateral axis. The headliner and the exterior panel 52 provide class-A surfaces to the roof 46, i.e., surfaces specifically manufactured to have a high-quality, finished aesthetic appearance free of blemishes, etc.

The roof 46 may include a trim panel (not numbered), e.g., the headliner, that conceals the front cable retractor 36, the rear cable retractor 38, and portions of the front cable 32 and the rear cable 34. In such examples, the trim panel (not numbered), e.g., the headliner may include a tear seam. The tear seam is designed to rupture upon retraction of the front cable 32 and the rear cable 34. The tear seam may be weaker than a portion of the trim panel (not numbered) adjacent the tear seam, e.g., the tear seam may be thinner, a weaker material, etc. The tear seam may connect panels of the trim panel (not numbered), e.g., with breakaway stitches. The tear seam may be elongated along the vehicle-longitudinal axis L.

The roof 46, e.g., a roof rail 48, extends from the front pillar 54 to the rear pillar 56. Specifically, the roof 46 extends from the front portion 24 to the rear portion 26 of the door opening frame 16. The roof 46 is a component of the door opening frame 16 and defines the upper boundary of the door opening 14. Specifically, the roof 46 includes the top portion 28 of the door opening frame 16. The top portion 28 is elongated along the vehicle-longitudinal axis from the front portion 24 to the rear portion 26. The vehicle body 12 may include two roof rails 48, one on each side of the vehicle body 12. The roof rails 48 are elongated along the vehicle-longitudinal axis L.

The vehicle body 12 may include pillars spaced from each along the vehicle-longitudinal axis L on both sides of the vehicle body 12. In the example shown in the Figures, the vehicle body 12 includes the front pillar 54 and the rear pillar 56 vehicle rearward of the front pillar 54 on each side of the vehicle body 12. The front pillar 54 may be disposed at the front end 20 of the occupant compartment 40 and the rear pillar 56 may be disposed at the rear end 22 of the occupant compartment 40. In the example shown in the Figures, the front pillar 54 and the rear pillar 56 are hinge pillars, i.e., the doors are hinged to the front pillar 54 and the rear pillar 56. The pillars may extend from the roof 46 to the floor 44. The vehicle 10 may include other pillars in addition to the front pillar 54 and the rear pillar 56.

The front pillar 54 and the rear pillar 56 are components of the door opening frame 16. The front pillar 54 includes the front portion 24 of the door opening frame 16 and the rear pillar 56 includes the rear portion 26 of the door opening frame 16. The front portion 24 of the door opening frame 16 defines the vehicle-forward boundary of the door opening 14 and the rearward portion of the door opening frame 16 defines the vehicle-rearward boundary of the door opening 14. The front portion 24 and the rearward portion of the door opening 14 are elongated upwardly.

In the example shown in the Figures, the vehicle body 12 may be pillarless between the front portion 24 and the rear portion 26 of the door opening frame 16. In such examples, the vehicle body 12 does not include a middle pillar between the front pillar 54 and the rear pillar 56, i.e., the vehicle body 12 does not include a middle pillar between the front pillar 54 and the rear pillar 56 that extends from the floor 44 to the roof 46. In other words, the vehicle body 12 in the example shown in the Figures has no middle pillar between the front pillar 54 and the rear pillar 56. The vehicle body 12 lacking a middle pillar allows for the door opening 14 to extend from the front pillar 54 to the rear pillar 56. The extension of the door opening 14 from the front pillar 54 to the rear pillar 56 may allow for easier occupant ingress and egress to the occupant compartment 40.

The floor 44 may include floor beams, a floor panel, and a sill 18. In such an example, the floor beams support the floor panel, and the floor panel defines the lower boundary of the occupant compartment 40. The floor panel may be steel, aluminum, carbon fiber, or any other suitable material. The floor 44 may include a covering, e.g., carpeting, over the floor panel.

The sill 18 extends from the front pillar 54 to the rear pillar 56. Specifically, the sill 18 extends from the front portion 24 to the rear portion 26 of the door opening frame 16. The sill 18 is a component of the door opening frame 16 and defines the lower boundary of the door opening 14. Specifically, the sill 18 includes a bottom portion of the door opening frame 16. The bottom portion is elongated along the vehicle-longitudinal axis from the front portion 24 to the rear portion 26. The vehicle body 12 may include two sills 18, one on each side of the vehicle body 12. The sills 18 are elongated along the vehicle-longitudinal axis L. The sills 18 may be adjacent the floor panel or may be a unitary component of the floor panel. The roof 46, sills 18, floor 44, and pillars may be irremovably fixed to each other, i.e., unable to be removed without cutting or other destruction of the roof 46, sills 18, floor 44, and pillars 54, 56. In some examples, the pillars may be unitary with the sills 18 and/or the roof 46, i.e., a single, uniform piece of material with no seams, joints, fasteners, or adhesives connecting the pillars, to the sills 18 and/or the roof 46. In such an example, the pillars 54, 56, and sills 18 and/or roof 46 may be formed together simultaneously as a single continuous unit, e.g., by stamping, molding, etc. In other examples, in the alternative to being unitary, the pillars 54, 56, may be formed separately from the sills 18 and/or roof 46 and subsequently connected to the sills 18 and/or roof 46, e.g., by welding.

The vehicle body 12 may include a sill covering 58. The sill covering 58 is above the sill 18 and the airbag 30, and the sill covering 58 covers the sill 18 and the airbag 30 when the airbag 30 is in the undeployed position. The sill covering 58 covers the portion of the front cable 32 along the sill 18 and covers the portion of the rear cable 34 along the sill 18 in the undeployed position. The airbag 30, the front cable 32, and the second cable 34 are disposed between the sill 18 and the sill covering 58 in the undeployed position. As set forth further below, the airbag 30, the front cable 32, and the second cable 34 may deploy from and/or through the sill covering 58 from the undeployed position to the raised position, e.g., through a tear seam in the sill covering 58, by dislodging the sill covering 58 from the sill 18, etc.

The sill covering 58 is between the front pillar 54 and the rear pillar 56 and, specifically, may extend from the front pillar 54 to the rear pillar 56. The sill covering 58 and/or the sill 18 defines the lower-most boundary of the door opening 14. The sill covering 58 faces upwardly and has a class-A surface, i.e., a finished surface exposed to view when doors are open and free of unaesthetic blemishes and defects. The sill covering 58 may be separate from the sill 18 as disposed above the sill 18. In such an example, the sill covering 58 may be fixed to the sill 18, e.g., with clips, fasteners, etc., and may be metal, plastic, fabric. As another example, the sill covering 58 may be unitary with the sill 18, i.e., may be an upper panel of the sill 18.

As set forth above, the vehicle body 12 includes the door opening 14. The front pillar 54 and the rear pillar 56 define the door opening 14 therebetween. The door opening 14 may be between the sill covering 58 and the roof 46. Specifically, the door opening 14 may extend from the front pillar 54 to the rear pillar 56 and from the sill covering 58 to the roof 46. In other words, the pillars, are spaced from each other by the door opening 14 and the roof 46 and sill covering 58 are spaced from each other by the door opening 14. The door opening 14 extends uninterrupted from the front pillar 54 to the rear pillar 56. The door opening 14 extends uninterrupted from the sill covering 58 to the roof 46. The door opening 14 allows for ingress into and egress from the occupant compartment 40. The vehicle 10 may include any suitable number of door openings 14 to allow for occupant ingress and egress. For example, the vehicle 10 may include one door opening 14 on each side of the vehicle 10. In other examples, the vehicle 10 may include multiple door openings 14 on each side of the vehicle 10. The vehicle 10 may include one or more doors 42, on any side of the vehicle body 12. As an example, the vehicle 10 may include a front door supported by the front pillar 54 and a rear door supported by the rear pillar 56. The front door and the rear door may be moveably mounted to the vehicle body 12, e.g., the front pillar 54 and the rear pillar 56, respectively. For example, the front door and the rear door may be slideably mounted, hingedly mounted, etc., to the vehicle body 12. As another example, the vehicle 10 may include a single door slideably mounted or hingedly mounted to one of the front pillar 54 or the rear pillar 56 and extends from the front pillar 54 to the rear pillar 56 when the door 42 is closed.

The vehicle 10 includes an airbag deployment assembly 60 including the front cable 32, the rear cable 34, a front cable guide 62, and a rear cable guide 64. As set forth above, the airbag deployment assembly 60 includes at least one cable retractor 36, 38. In the example shown in the Figures, the airbag deployment assembly 60 includes two cable retractors 36, 38, namely the front cable retractor 36 and the rear cable retractor 38. The front cable retractor 36 and the rear cable retractor 38 move the front cable 32 and the rear cable 34, respectively, to the raised position. As set forth above, the airbag 30 is supported by the front cable 32 and the rear cable 34 such that the front cable 32 and the rear cable 34 pull the airbag 30 upwardly from the undeployed position to the raised position.

The airbag 30, the front cable 32, and the rear cable 34 are vehicle-inboard of the door(s) 42 and the door opening 14 when the airbag 30 is in the raised position. Specifically, when the doors 42, are closed, the front cable 32 and the rear cable 34 are vehicle-inboard of the doors 42 and between the door(s) 42 and the occupant compartment 40.

The front cable 32 and the rear cable 34 may be metal, composite (e.g., carbon fiber), or any other suitable type of material. The cables 32, 34, may be flexible relative to the door opening frame 16 and the cable guides 62, 64 to allow for deployment of the cable 32, 34 from the undeployed position to the raised position.

The cable guides 62, 64 guide the respective cables 32, 34 during movement of the airbag 30 from the undeployed position to the raised position, and position the cables 32, 34 around the door opening 14 in the raised position. In the example shown in the Figures, the vehicle 10 includes two cable guides 62, 64, i.e., one for the front cable 32 and one for the rear cable 34. In other examples, the vehicle 10 may include any suitable number of cable guides 62, 64 at any suitable location along the door opening frame 16.

The front cable guide 62 is fixed to the vehicle body 12 and the rear cable guide 64 is fixed to the vehicle body 12. As an example, as shown in the example in the Figures, the front cable guide 62 is fixed to the front pillar 54 at the front portion 24 of the door opening 14 and the rear cable guide 64 is fixed to the rear pillar 56 at the rear portion 26 of the door opening 14. The front cable guide 62 and the rear cable guide 64 may be fixed to the vehicle body 12 in any suitable fashion, e.g., threaded fasteners, welding, etc. The front cable guide 62 and the rear cable guide 64 may remain stationary at the vehicle body 12 as the airbag 30 moves from the undeployed position to the raised position. In some examples, the cable guides 62, 64 may be stationary posts, in which case the cable slides along the respective cable guide. As another example, the cable guides 62, 64 may include rotatable pulleys, in which case the pulley rotates as the cable moves relative to the cable guide. The cable guides 62, 64 may include features to retain the cable 32, 34 on the respective cable guide 62, 64. For example, the cable guide may include lips, flanges, etc., to maintain the cable 32, 34 on the respective cable guide 62, 64.

The vehicle 10 includes an airbag assembly including the airbag 30. The airbag assembly includes an inflator 66 in fluid communication with the airbag 30 to inflate the airbag 30 to an inflated position, as described below.

The airbag 30 is mounted to the sill 18 in the undeployed position and in the raised position. The airbag 30 may be mounted to the sill 18 in any suitable fashion, e.g., threaded fasteners, clips, brackets, adhesive, etc. The airbag 30 may be rolled and/or folded on the sill 18, e.g., between the sill 18 and the sill covering 58, in the undeployed position. In the raised position, a bottom end of the airbag 30 remains mounted to the sill 18.

The inflator 66 expands the airbag 30 with inflation medium, such as a gas, to move the airbag 30 from the uninflated position to the inflated position. Specifically, the airbag 30 includes an inflation chamber and the inflator supplies inflation medium to the inflation chamber to inflate the airbag 30 from an uninflated position (FIGS. 1 and 3) to the inflated position (FIGS. 2 and 4). The inflator 66 may be supported by any suitable component of the vehicle 10, e.g., the floor 44. The inflator 66 may be, for example, a pyrotechnic inflator 66 that ignites a chemical reaction to generate the inflation medium, a stored gas inflator 66 that releases (e.g., by a pyrotechnic valve) stored gas as the inflation medium, or a hybrid. The inflator 66 may be, for example, at least partially in the inflation chamber to deliver inflation medium directly to the inflation chamber or may be connected to the inflation chamber through fill tubes, diffusers, etc. Specifically, the inflator 66 may be fixed to the vehicle body 12 and connected with the inflation chamber through fill tubes and/or diffusers that move with the airbag 30 as the airbag 30 is raised relative to the vehicle body 12 from the undeployed position to the raised position.

The airbag 30 may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

The airbag 30 is positioned between the front cable 32 and the rear cable 34 in the raised position to control the kinematics of the occupant during certain vehicle 10 side impacts. The airbag 30 is supported by the front cable 32 and the rear cable 34 in the raised position. Specifically, the weight of the airbag 30 is borne by the front cable 32 and the rear cable 34. When the front cable 32 and the rear cable 34 move from the undeployed position to the raised position, the front cable 32 and the rear cable 34 move across the door opening 14 and moves the airbag 30 across the door opening 14.

The airbag 30 is moveable with the front cable 32 and the rear cable 34 from the undeployed position to the raised position. The airbag 30 may be inflated from an uninflated position to an inflated position simultaneously with the upward deployment of the front cable 32 and the rear cable 34 by the front cable retractor 36 and the rear cable retractor 38, respectively. A computer 68 of the vehicle 10, e.g., a restraints control module, may instruct the activation of the front cable retractor 36 and the rear cable retractor 38. The computer 68 may instruct the activation of the cable retractors 36, 38 and the inflator 66 in response to certain detected vehicle impacts, e.g., a side impact.

The front cable 32 and the rear cable 34 each connected to the airbag 30. The airbag 30 moves as a unit with the front cable 32 and the rear cable 34 from the undeployed position to the raised position, and the front cable 32 and the rear cable 34 support the airbag 30 on the vehicle 10 opening frame in the raised position. The airbag deployment assembly 60 includes tethers 70 (i.e., front tethers 70) extending from the front cable 32 to the airbag 30 and tethers 70 (i.e., rear tethers 70) extending from the rear cable 34 to the airbag 30.

In the example shown in the Figures, two tethers 70 (i.e., a top front tether and a bottom front tether) extend from the front cable 32 to the airbag 30, and two tethers 70 (i.e., a top rear tether and a bottom rear tether) extend from the rear cable 34 to the airbag 30. In that example, one of the tethers 70 extends from the front cable 32 to the airbag 30 at the front cable retractor 36 in the raised position and one of the tethers 70 extends from the front cable 32 to the airbag 30 at the front cable guide 62 in the raised position. Similarly, one of the tethers 70 extends from the rear cable 34 to the airbag 30 at the rear cable retractor 38 in the raised position and one of the tethers 70 extends from the rear cable 34 to the airbag 30 at the rear cable guide 64 in the raised position. In such an example, the tethers 70 at the cable retractors 36, 38 establish a load path from the airbag 30 to door opening frame 16 through the cable retractors 36, 38, and the tethers 70 at the cable guides 62, 64 establish a load path from the airbag 30 to the door opening frame 16 through the cable guides 62, 64. In other examples, the airbag deployment assembly 60 may have any suitable numbers of tethers 70 in any suitable locations.

In some examples, the tethers 70 may be fabric. In such examples, the tethers 70 may be of the same material type as the airbag 30. In other examples, the tethers 70 may be metal cord, polymeric cord, composite cord, etc. The tethers 70 are fixed to the airbag 30 and move with the airbag 30 as a unit, and the tethers 70 are fixed to the respective cable and move with the respective cable as a unit. The tethers 70 can be fixed to the airbag 30 and the cable in any suitable way, e.g., adhesive, bonding, stitching, other mechanical engagement, etc.

The front cable retractor 36 and the rear cable retractor 38 are mounted to the vehicle body 12. For example, the cable retractors 36, 38 may be mounted to the roof 46, e.g., the roof rail 48. As an example, the cable retractors 36, 38 may be mounted to the roof 46 at the top portion 28 of the door opening frame 16. The cable retractors 36, 38 may be mounted to the roof 46 in any suitable fashion, e.g., threaded fasteners, brackets, etc.

The front cable 32 and the rear cable 34 are operatively engaged with the front cable retractor 36 and the rear cable retractor 38 to pull the airbag 30 upwardly from the undeployed position to the raised position. Specifically, the front cable retractor 36 is operatively engaged with the front cable 32 to retract the front cable 32 upwardly, and the rear cable retractor 38 is operatively engaged to the rear cable 34 to retract the rear cable 34 upwardly to deploy the airbag 30 upwardly to the raised position. The front cable retractor 36 and the rear cable retractor 38 pull the front cable 32 and the rear cable 34, respectively, upwardly to the raised position when the front cable retractor 36 and the rear cable retractor 38 are activated.

In some examples, the front cable retractor 36 and the second cable 34 retractor may be any suitable type such as a rotary actuator in which a pyrotechnic charge rotates a shaft connected to the cable such that the cable wraps around the shaft. In other examples, the cable retractor may be a linear actuator, e.g., a piston linkage in which a pyrotechnic charge drives a piston attached to the cable; a ball-in-tube linkage in which a pyrotechnic charge propels a ball or balls over a cogwheel connected to the cable; a mechanical linkage in which a compressed spring attached to the cable 32, 34 is released; or any other suitable type.

In examples in which the front cable retractor 36 and the rear cable retractor 38 are pyrotechnically activated, the pyrotechnic charge activates components of the cable retractor to retract the tether 70. The pyrotechnic charge is combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (Si02), which react to form nitrogen gas (N2).

The cable retractors 36, 38 may be designed to irreversibly retract the respective cable. In other words, in such examples, the cable retractors 36, 38 retract the respective cable 32, 34 and prevent the cable 32, 34 from feeding out of the cable retractor 36, 38 so that the cable retractor 36, 38 and the cable 32, 34 support the airbag 30 in the raised position.

The front cable 32 in the undeployed position is packaged along the front portion 24 and the top portion 28 of the door opening frame 16 from the airbag 30 to the at least one cable retractor, e.g., the front cable retractor 36. The rear cable 34 in the undeployed position is packaged along the rear portion 26 and the top portion 28 of the door opening frame 16 from the airbag 30 to the at least one cable retractor, e.g., the rear cable retractor 38. The front cable 32 and the rear cable 34 are concealed along the sill 18, the front portion 24 of the door opening frame 16, the rear portion 26 of the door opening frame 16, and the top portion 28 of the door opening frame 16 when the airbag 30 is in the undeployed position and do not interfere with occupant ingress and egress. In the raised position, the front cable 32 and the rear cable 34 are routed from the sill 18, along the front portion 24 of the door opening frame 16, the rear portion 26 of the door opening frame 16, and the top portion 28 of the door opening frame 16 to the respective cable retractor to support the airbag 30 across the door opening 14. The front cable 32 and the rear cable 34 anchor the airbag 30 to the periphery of the door opening 14.

The front cable guide 62 is fixed to a top half of the front portion 24 of the door opening frame 16 and the rear cable guide 64 is fixed to a top half of the rear portion 26 of the door opening frame 16. A midline of the front portion 24 and the rear portion 26 is identified with line M in FIG. 1. The front cable retractor 36 and the second cable 34 retractor are mounted to the vehicle body 12 above the top portion 28 of the door opening frame 16. In the undeployed position, the front cable 32 extends vehicle rearward from the front portion 24 of the door opening frame 16 along the top portion 28 of the door opening frame 16, and the rear cable 34 extends vehicle forward from the rear portion 26 of the door opening 14 along the top portion 28 of the door opening frame 16 in the undeployed position. Specifically, the front cable 32 extends from the airbag 30 along the front pillar 54 around the front cable guide 62 to the front cable retractor 36 in the undeployed position, and the front cable 32 extends upwardly from the sill 18 around the front cable guide 62 and rearward to the front cable retractor 36 in the raised position. The rear cable 34 extends from the airbag 30 along the rear pillar 56 around the rear cable guide 64 to the rear cable retractor 38 in the undeployed position, and the rear cable 34 extends upwardly from the sill 18 around the rear cable guide 64 and forward to the rear cable retractor 38 in the raised position.

In the undeployed position, the front cable 32 includes slack 72 stored at the sill 18 and the rear cable 34 includes slack 72 at the sill 18. The slack 72 in the cables 32, 34 is pulled upwardly by the front cable retractor 36 and the rear cable retractor 38 to the raised position. As an example, the slack 72 may be coiled or folded at the sill 18 in the undeployed position.

The vehicle 10 includes at least one trim panel (not numbered) concealing the front cable 32, the rear cable 34, the cable retractor 36, 38, and the airbag 30 against the door opening frame 16 in the undeployed position. In some examples, multiple trim panels (not numbered), in combination, conceal the front cable 32, the rear cable 34, the at least one cable retractor, and the airbag 30. The activation of the cable retractors 36, 38 and the inflator 66 urge the trim panels (not numbered) to release and/or tear to release the cables 32, 34 and the airbag 30. The trim panels (not numbered) may be of any suitable material, e.g., plastic, upholstered, etc., and may include a class-A surface facing the occupant compartment 40.

Figure 5:
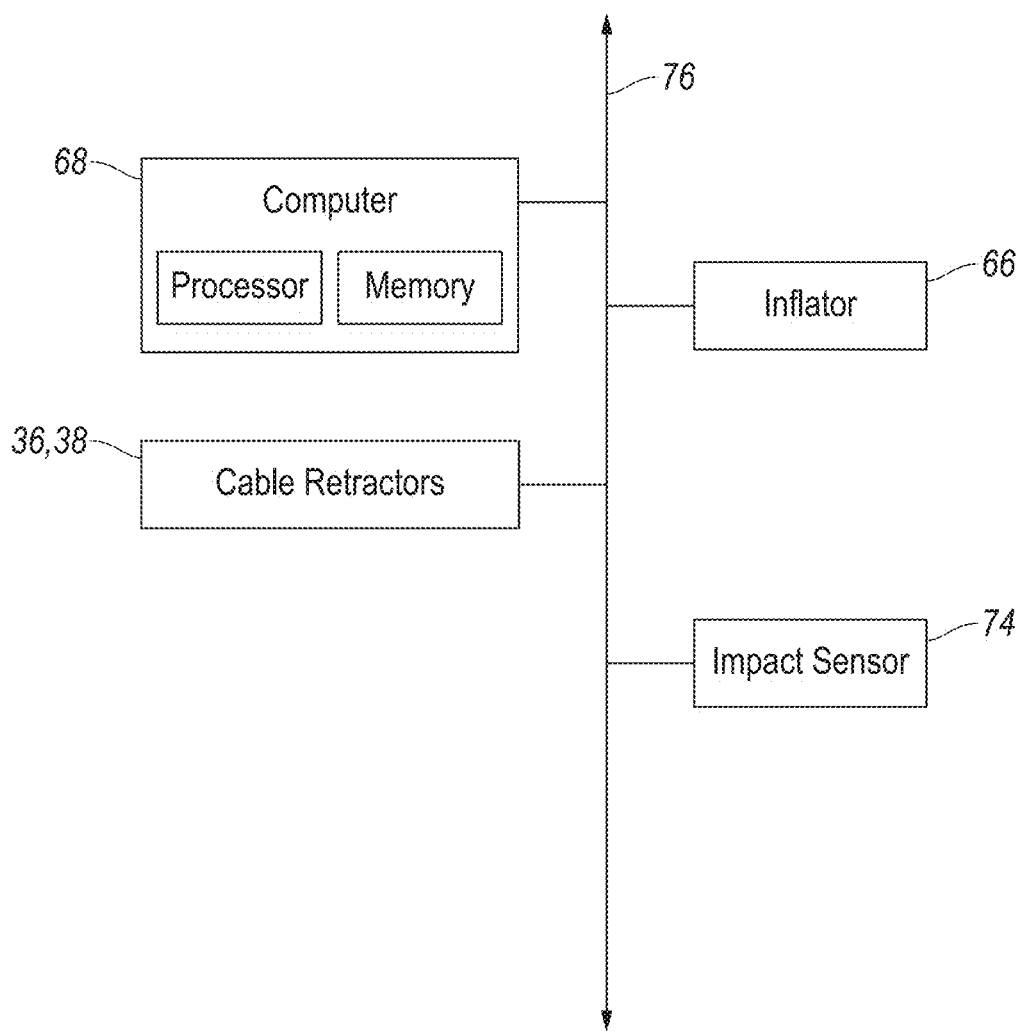
FIG. 5 is a block diagram of a system of the vehicle.

With reference to FIG. 5, the vehicle 10 includes a computer 68 in communication with the cable retractors 36, 38 and the inflator 66. The vehicle 10 may include at least one impact sensor 74 for sensing certain vehicle impacts (e.g., impacts of a certain magnitude, direction, etc.). The computer 68 may activate the inflator 66 and the cable retractors 36, 38 when the impact sensor 74 senses certain vehicle impacts. The impact sensor 74 may be configured to sense certain vehicle impacts prior to impact, i.e., pre-impact sensing. The impact sensor 74 may be in communication with the computer 68. The impact sensor 74 is configured to detect certain vehicle impacts. In other words, a "certain vehicle impact" is an impact of the type and/or magnitude for which inflation of the airbag 30 is designed i.e., "certain" indicates the type and/or magnitude of the impact. The type and/or magnitude of such "certain vehicle impacts" may be pre-stored in the computer 68, e.g., a restraints control module and/or a body control module. The impact sensor 74 may be of any suitable type, for example, post contact sensors such as accelerometers, pressure sensors, and contact switches; and pre-impact sensor 74s such as radar, LIDAR, and vision sensing systems. The vision sensing systems may include one or more cameras, CCD image sensors, CMOS image sensors, etc. The impact sensor 74 may be located at numerous points in or on the vehicle 10.

The computer 68 includes a processor and a memory. The memory includes one or more forms of computer readable media, and stores instructions executable by the processor for performing various operations, including as disclosed herein. For example, the computer 68 can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer 68 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer 68. The memory can be of any type, e.g., hard disk drives, solid state drives, servers, or any volatile or non-volatile media. The memory can store the collected data sent from the sensors. The memory can be a separate device from the computer 68, and the computer 68 can retrieve information stored by the memory via a network in the vehicle 10, e.g., over a CAN bus, a wireless network, etc. Alternatively or additionally, the memory can be part of the computer 68, e.g., as a memory of the computer 68. The computer 68 may include or be communicatively coupled to, e.g., via a vehicle 10 communication network such as a communications bus as described further below, more than one processor, e.g., included in components such as sensors, electronic control units (ECUs) or the like included in the vehicle 10 for monitoring and/or controlling various vehicle components. As shown in FIG. 5, the computer 68 is generally arranged for communications on a vehicle communication network 76 that can include a bus in the vehicle 10 such as a controller area network CAN or the like, and/or other wired and/or wireless mechanisms. Alternatively or additionally, in cases where the computer 68 includes a plurality of devices, the vehicle communication network 76 may be used for communications between devices represented as the computer 68 in this disclosure. Various controllers and/or sensors may provide data to the computer 68 via the vehicle 10 communication network 76.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a vehicle body including a door opening and a door opening frame encircling the door opening;
   the door opening frame including a sill elongated along a vehicle-longitudinal axis from a front end of the sill to a rear end of the sill;
   the door opening frame having a front portion extending upwardly from the front end of the sill and a rear portion extending upwardly from the rear end of the sill;
   the door opening frame having a top portion extending along the vehicle-longitudinal axis from the front portion to the rear portion;
   an airbag mounted to the sill and deployable upwardly toward the top portion of the door opening frame from an undeployed position to a raised position;
   a front cable and a rear cable each connected to the airbag; and
   at least one cable retractor mounted to the vehicle body above the top portion of the door opening frame, the front cable and the rear cable being operatively engaged with the at least one cable retractor to pull the airbag upwardly from the undeployed position to the raised position;
   the front cable in the undeployed position being packaged along the front portion and the top portion of the door opening frame from the airbag to the at least one cable retractor;
   the rear cable in the undeployed position being packaged along the rear portion and the top portion of the door opening frame from the airbag to the at least one cable retractor.

2. The vehicle as set forth in claim 1, wherein the airbag is moveable with the front cable and the rear cable from the undeployed position to the raised position, the airbag being supported by the front cable along the front portion and top portion of the door opening frame in the raised position, and the airbag being supported by the rear cable along the rear portion and the top portion of the door opening frame in the raised position.

3. The vehicle as set forth in claim 1, further comprising a front cable guide fixed to the vehicle body and a rear cable guide fixed to the vehicle body, the front cable being slideably engaged with the front cable guide, and the rear cable being slideably engaged with the rear cable guide.

4. The vehicle as set forth in claim 3, wherein the front cable guide is fixed to a top half of the front portion of the door opening frame and the rear cable guide is fixed to a top half of the rear portion of the door opening frame.

5. The vehicle as set forth in claim 1, wherein the at least one cable retractor includes a front cable retractor and a rear cable retractor spaced vehicle rearward of the front cable retractor, the front cable being engaged with the front cable retractor, and the rear cable being engaged with the rear cable retractor.

6. The vehicle as set forth in claim 5, further comprising a front cable guide fixed to the vehicle body and a rear cable guide fixed to the vehicle body, the front cable being slideably engaged with the front cable guide, and the rear cable being slideably engaged with the rear cable guide.

7. The vehicle as set forth in claim 6, wherein the front cable extends from the airbag around the front cable guide to the front cable retractor in the undeployed position and the raised position, and the rear cable extends from the airbag around the rear cable guide to the rear cable retractor in the undeployed position and the raised position.

8. The vehicle as set forth in claim 7, further comprising a top front tether and a bottom front tether each extending from the front cable to the airbag, and a top rear tether and a bottom rear tether each extending from the rear cable to the airbag.

9. The vehicle as set forth in claim 8, wherein the top front tether extends from the front cable to the airbag at the front cable retractor in the raised position, the bottom front tether extends from the front cable to the airbag at the front cable guide in the raised position, the top rear tether extends from the rear cable to the airbag at the rear cable retractor in the raised position, the bottom rear tether extends from the rear cable to the airbag at the rear cable guide in the raised position.

10. The vehicle as set forth in claim 5, further comprising a front tether extending from the front cable to the airbag at the front cable retractor in the raised position and a rear tether extending from the rear cable to the airbag at the rear cable retractor in the raised position.

11. The vehicle as set forth in claim 1, further comprising at least two tethers extending from the front cable to the airbag and at least two tethers extending from the rear cable to the airbag.

12. The vehicle as set forth in claim 1, wherein the vehicle body includes a roof and the at least one cable retractor is mounted to the roof.

13. The vehicle as set forth in claim 1, wherein the front cable extends vehicle rearward from the front portion of the door opening frame along the top portion of the door opening frame in the undeployed position, and the rear cable extends vehicle forward from the rear portion of the door opening frame along the top portion of the door opening frame in the undeployed position.

14. The vehicle as set forth in claim 1, wherein a slack in the front cable and a slack in the rear cable are stored at the sill in the undeployed position.

15. The vehicle as set forth in claim 1, further comprising at least one trim panel concealing the front cable, the rear cable, the at least one cable retractor, and the airbag against the door opening frame in the undeployed position.

16. The vehicle as set forth in claim 1, further comprising at least one door in the door opening.

17. The vehicle as set forth in claim 1, further comprising two doors in the door opening.

18. The vehicle as set forth in claim 17, wherein the door opening is pillarless between the front portion and the rear portion of the door opening frame.

19. The vehicle as set forth in claim 17, wherein the airbag deploys vehicle inboard of both of the doors in the raised position.

20. The vehicle as set forth in claim 1, further comprising an inflator supported by the vehicle body, the inflator being in fluid communication with the airbag.

* * * * *